United States Patent [19]
Chiang et al.

[11] Patent Number: 5,635,581
[45] Date of Patent: Jun. 3, 1997

[54] FULLERENE POLYMERS

[75] Inventors: Long Y. Chiang; Lee-Yih Wang; Kuo-Huang Hsieh, all of Taipei, Taiwan

[73] Assignee: National Science Counsel, Taiwan

[21] Appl. No.: 345,251

[22] Filed: Nov. 28, 1994

[51] Int. Cl.$^6$ ............................................. C08G 81/00
[52] U.S. Cl. .......................... 528/60; 528/85; 525/330.4; 525/330.5; 525/332.7; 525/333.1; 525/410; 525/418; 525/452; 525/461; 525/474
[58] Field of Search ............... 525/330.4, 330.5, 525/332.7, 333.1; 528/60, 85

[56] References Cited

U.S. PATENT DOCUMENTS

| | | | |
|---|---|---|---|
| 3,859,382 | 1/1975 | Hergenrother et al. | 525/123 |
| 4,820,368 | 4/1989 | Markevka et al. | 156/307.3 |
| 4,855,403 | 8/1989 | Meschke et al. | 528/419 |
| 5,030,695 | 7/1991 | Cozewith et al. | 525/207 |
| 5,177,248 | 1/1993 | Chiang et al. | 560/86 |
| 5,292,813 | 3/1994 | Patil et al. | 525/240 |
| 5,294,732 | 3/1994 | Chiang et al. | 560/86 |

FOREIGN PATENT DOCUMENTS

| | | | |
|---|---|---|---|
| 0 544 513 A1 | 6/1993 | European Pat. Off. | C08K 3/04 |
| 0 546 718 A2 | 6/1993 | European Pat. Off. | C07C 43/188 |
| 0 575 129 A1 | 12/1993 | European Pat. Off. | C01B 31/02 |

OTHER PUBLICATIONS

ET Samulski et al. Chem Mater 4 (1992) 1153.

A.O. Patil, et al., "Fullerene Functionalized Polymers", *Polymer Bulletin*, 30, 187–190 (1993).

Wooley, et al., "Fullerene–Bound Dendrimers: Soluble Isolated Carbon Clusters", *J. Am. Chem. Soc.*, 1993, 115, 9836–9837.

Chiang, et al., "Efficient Synthesis of Polyhydroxylated Fullerene Derivatives via Hydrolysis of Polycyclosulfated Precursors", *J. Org. Chem.*, 1994, 59, 3960–3968.

Andreas Hirsch, "Fullerene Polymers", Advanced Materials, 5:859–561, 1993.

*Primary Examiner*—Mark Nagumo
*Attorney, Agent, or Firm*—Fish & Richardson P.C.

[57] ABSTRACT

The present invention relates to a polymer including a fullerene core and a plurality of prepolymer units. Each of the prepolymer units is linked to a carbon atom of the core by a moiety independently selected from the group consisting of —O—(C=O)—NH—, —NH—(C=O)—NH—, —O—(C=S)—NH—, and —N—(C=S)—NH—.

19 Claims, 2 Drawing Sheets

FULLERENE POLYMERS

BACKGROUND OF THE INVENTION

Fullerenes are a class of carbon molecules having an even number of carbon atoms arranged in the form of a closed hollow cage, typically spheroid, wherein the carbon-carbon bonds define a polyhedral structure.

Fullerene monolayers have been described. See, e.g., K. Chen, et al. *J. Am. Chem. Soc.*, 115 (1993) 1193 (the self-assembled monolayer (SAM) of covalently bonded fullerenes on $(MeO)_3Si(CH_2)_3NH_2$-modified oxide surfaces), and in W. B. Calwell, et al. *Langmuir*, 9 (1993) 1945 (SAM on $HS(CH_2)NH_2$-modified gold surfaces).

Similarly, some fullerenes with relatively small functional groups or addends such as amido, alkoxy, and halides have been described. See, e.g., U.S. Pat. No. 5,177,248; European Application No. 546,718 (treatment of unfunctionalized fullerenes with trifluoromethanesulfonic acid and nucleophiles to form alkoxylated fullerenes); European Application No. 575,129 (treatment of unfunctionalized fullerenes with sulfuric acid to form sulfated fullerenes).

However, few macromolecules have been attached to fullerenes. K. L. Wooley, et al. (*J. Am. Chem. Soc.*, 115 (1993) 9836) attached two dendritic (highly branched, fan-shaped) polyphenylethers to a bifunctionalized fullerene with an ether linkage. A broad mixture of products with between 1 and 10 polystyrene chains attached was obtained from reacting unfunctionalized fullerenes with living polystyrene (carbon-carbon linkage) (E. T. Samulski, et al., *Chem. Mater.*, 4 (1992) 1153). Unfunctionalized fullerene have also been grafted with some cross-linking to an amine-containing linear polymer (carbon-nitrogen linkage) (A. O. Patil, et al., *Polymer Bull.*, 30 (1993) 187).

SUMMARY OF THE INVENTION

One aspect of the present invention relates to a polymer which contains at least one fullerene core and a plurality of prepolymer units bonded to the fullerene core. More specifically, each of the prepolymer units is linked to a carbon atom of the core by a linking moiety $M^1$ in the manner of F—$M^1$—P, wherein F represents the fullerene core, P represents one of the prepolymer units, and $M^1$ is independently selected from the group consisting of —O—(C=O)—NH—, —NH—(C=O)—NH—, —O—(C=S)—NH—, and —NH—(C=S)—NH—; a carbon atom of the core being bonded to the left-terminal oxygen or nitrogen atom of $M^1$ and the right-terminal nitrogen atom of $M^1$ being bonded to a carbon atom of each of the prepolymer units. Thus, the embodiments of the invention include polyurethane fullerene polymers, polythiourethane fullerene polymers, polyurea fullerene polymers, polythiourea fullerene polymers, and mixed polymers, e.g., poly(urea-urethane) fullerene polymers. The polymers derive from the multiplicity of prepolymer units which are bonded to the fullerene core, and each prepolymer unit may in addition be connected end-to-end to another prepolymer unit.

The term "fullerene core" refers to a fullerene, such as $C_{60}$, $C_{70}$, $C_{76}$, $C_{80}$, $C_{84}$, or $C_{120}$, which may be substituted with an alkyl, alkoxy, aryl, or organocarboxy group of between 1 and 20 carbon atoms, and which may also be functionalized with amino, hydroxy or other groups not bonded to a prepolymer unit. The term "a plurality of prepolymer units" or the like in this disclosure is meant to include between 2 and 32. Examples include ranges such as 2–24, 2–16, 4–12, and 6–10; or numbers such as 6, 7, and 10, where the number or range is an average number of, e.g., prepolymer units per fullerene core. This number or range is determined by methods well-known to those skilled in the art; an example of such a method is provided below in Example 4. One preferred embodiment of this invention has an average of 6 prepolymer units per $C_{60}$, with a relatively narrow distribution range. One embodiment of this invention has a polydispersity of 1.45.

The prepolymer unit P may have, for example, the formula —$R^1$—$M^2$—$R^2$—$M^3$—$R^3$—X, wherein $R^1$ and $R^3$ are each, independently, a hydrocarbon moiety of 1 to 20 carbon atoms, which is bonded to the right-terminal nitrogen atom of $M^1$ and $M^3$, respectively. $M^2$ is selected from the group consisting of —NH—(C=O)—O—, —NH—(C=O)—NH—, —NH—(C=S)—O—, and —NH—(C=S)—NH—. As indicated by the formula, the left-terminal nitrogen atom of $M^2$ is bonded to the right-terminal carbon atom of $R^1$, and so on. $R^2$ is a polymeric moiety selected from the group consisting of poly(tetramethylene oxide), poly (ethylene oxide), poly(butadiene), poly(isoprene), poly (hydrogenated butadiene), poly(hydrogenated isoprene), polyester, polyethylene, polycarbonate, polyamide, polyurethane, polyurea, polyanhydride, polyimide, polyacrylate, polymethacrylate, and polysiloxane. $M^3$ is independently selected from the group consisting of —O—(C=O)—NH—, —NH—(C=O)—NH—, —O—(C=S)—NH—, and —NH—(C=S)—NH—. X is a moiety selected from the group consisting of —NH—(C=O)—O—, —NH—(C=O)—NH—, —NH—(C=S)—O—, —NH—(C=S)—NH—, —N=C=O, and —N=C=S. X may also be selected from —NH—(C=O)—O—Y, —NH—(C=O)—NH—Y, —NH—(C=S)—O—Y, and —NH—(C=S)—NH—Y, wherein Y is hydrogen, or a hydrocarbon moiety of 1 to 20 carbon atoms. The hydrocarbon moiety mentioned in this disclosure may be substituted or unsubstituted; saturated or unsaturated; acylic, cyclic, or polycyclic. Note that the orientation of each of the above moieties is understood to be that as drawn. Preferred embodiments include those where $M^1$ and $M^3$ are both —O—(C=O)—NH—, and $M^2$ is —NH—(C=O)—O—and X is —NH—(C=O)—O— or —NH—(C=O)—O—Y; where $M^1$ and $M^3$ are both —O—(C=S)—NH—, and $M^2$ is —NH—(C=S)—O— and X is —NH—(C=S)—O— or —NH—(C=S)—O—Y; where $R^1$ and $R^3$ are each 4,4'-methylene diphenyl; where X is —N=C=O or —N=C=S; or where $R^1$ is 4,4'-methylene diphenyl, $R^2$ is a polymeric moiety of poly(tetramethylene oxide), and $R^3$ is 4,4' methylene diphenyl. In another embodiment, X is preferably —NH—(C=O)—O—, —NH—(C=O)—NH—, —NH—(C=S)—O—, or —NH—(C=S)—NH—, where a second fullerene core is bonded to X; or is —N=C=O, —N=C=S, —NH—(C=O)—O—Y, —NH—(C=O)—NH—Y, —NH—(C=S)—O—Y, or —NH—(C=S)—NH—Y.

An example of the polymer described in the preceeding paragraph is a sole fullerene core with a plurality of prepolymer units bonded thereto; in other words, the fullerene core is not linked to other fullerene cores. In another embodiment, a fullerene core is linked to at least one other core, e.g., via a prepolymer unit. In this latter case, moiety X is —NH—(C=O)—O—, —NH—(C=O)—NH—, —NH—(C=S)—O—, or —NH—(C=S)—NH—, and the right-terminal oxygen or nitrogen atom of X is bonded to a carbon atom of the second fullerene core. The first fullerene core may be thus linked to a plurality of satellite fullerene cores, which in turn may also be linked to additional fullerene cores.

As will be described in more detail below, methods of preparing such polymers are also within the invention.

Prepolymer units increase the intermolecular interaction among functional groups bonded to either the same or different fullerene cores; thus polymers of the present invention are not only suitable for the manufacture of viscosity modifiers and other rheological applications, but also serve as superior crosslinking agents for the preparation of polymer networks and for the manufacture of elastomers, as well as other polymer applications known to those skilled in the art.

Other features and advantages of the present invention will be apparent from the following description of the preferred embodiments, and also from the appending claims.

DESCRIPTION OF THE PREFERRED EMBODIMENT

Figure 1:
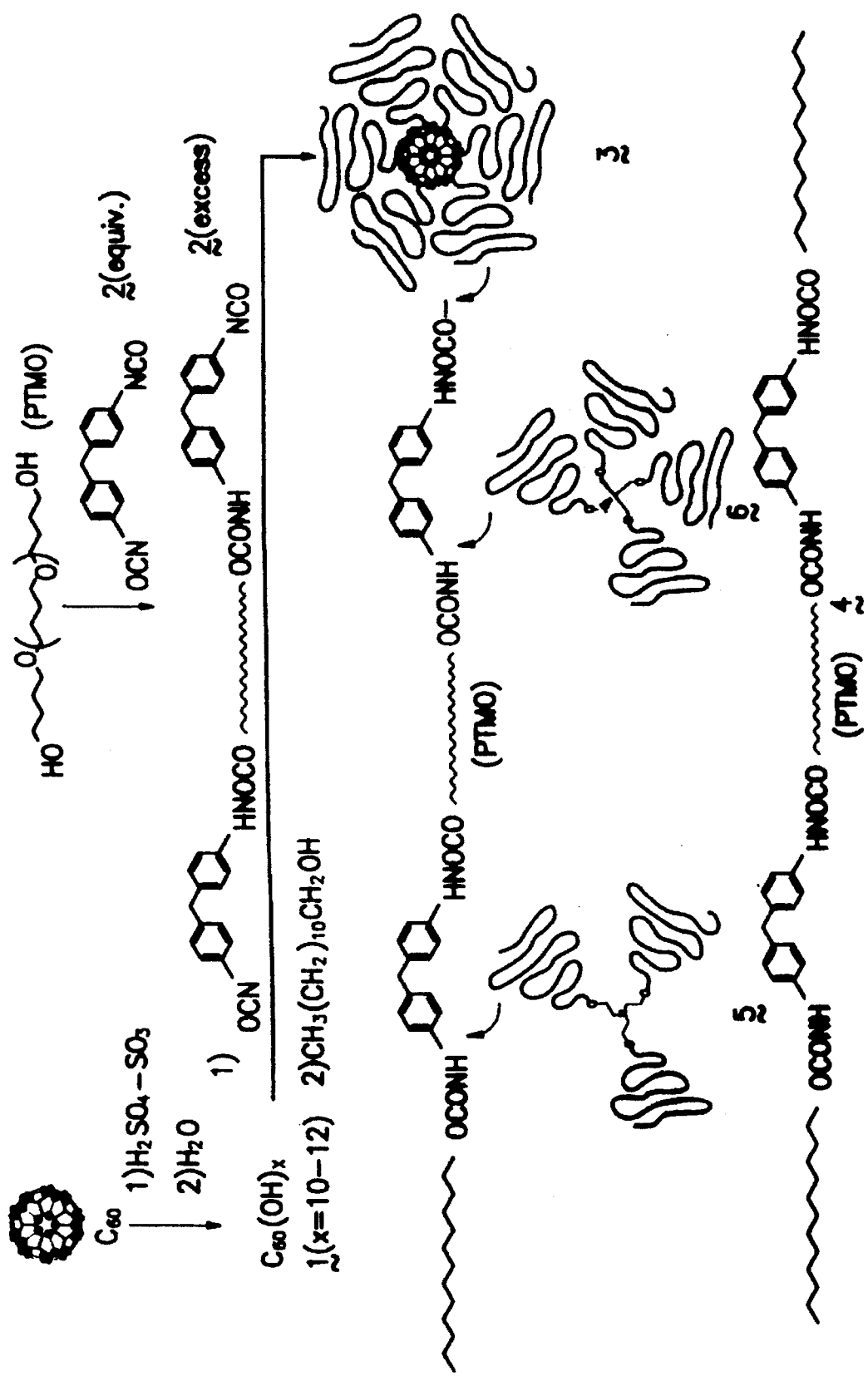
FIG. 1 is a synthetic pathway for forming a preferred embodiment of the present invention that is not cross-linked, and includes a schematic drawing of additional related structures.
Figure 2:
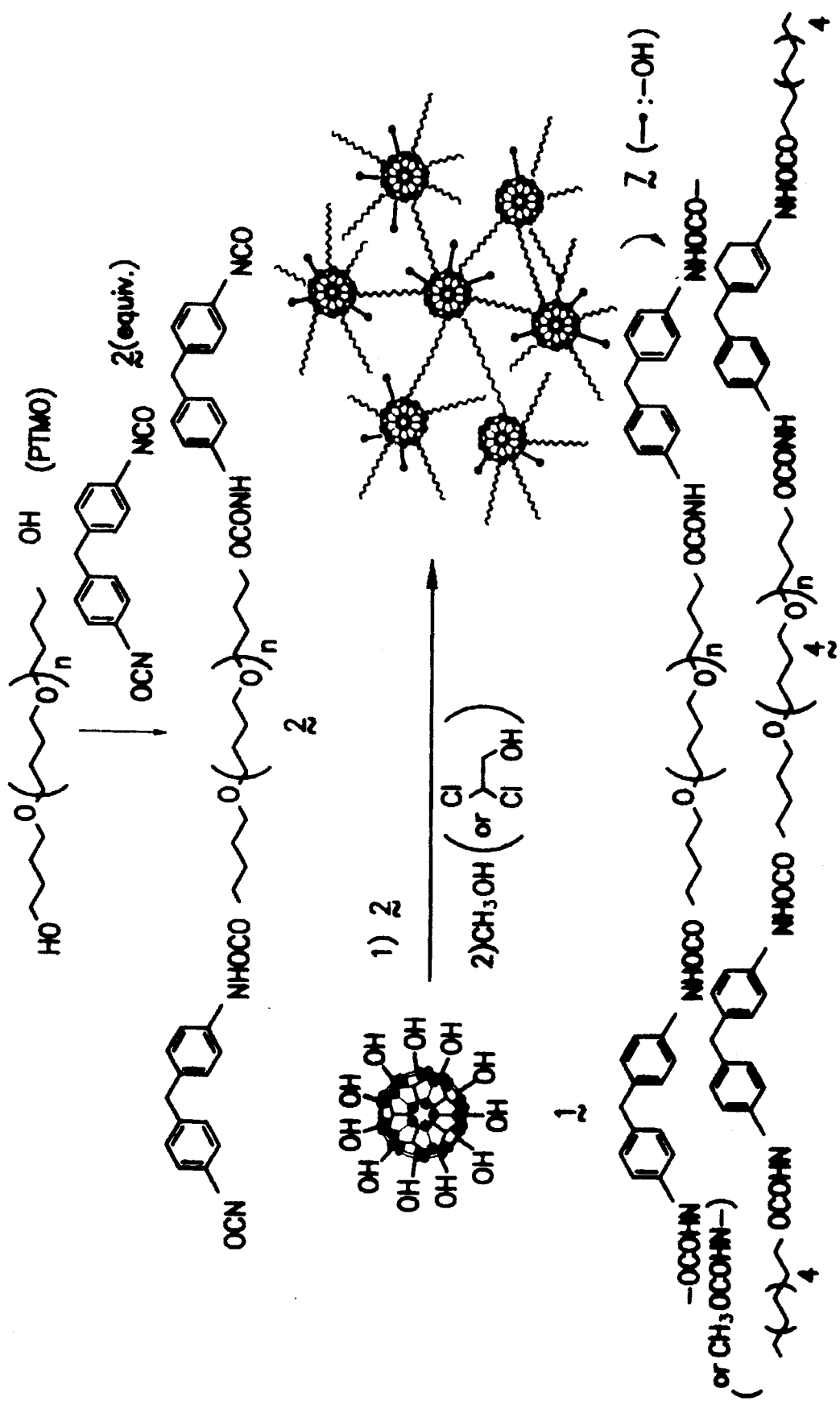
FIG. 2 is a synthetic pathway for forming a preferred embodiment of the present invention that is a cross-linked polymer.

The present invention relates to fullerene derivatives which include one or more fullerene cores and at least two, and preferably three or more, prepolymer units linked to each fullerene core. The prepolymer units are linked to the fullerene cores via the linking moieties —O—(C=O)—NH—, —NH—(C=O)—NH—, —O—(C=S)—NH—, and —NH—(C=S)—NH—. These moieties are identical to those found in urethane, urea, thiourethane, and thiourea, respectively.

The present invention includes a polymer containing a fullerene core not linked to other fullerene cores. As an example, each $C_{60}$ core on average is linked to at least two prepolymer units, wherein a carbon atom of the core is bonded to, e.g., the left-terminal oxygen of the linking moiety —O—(C=O)—NH—. In this example, the right-terminal nitrogen of the linking moiety is bonded to a carbon atom of a prepolymer unit.

A prepolymer unit can be a simple hydrocarbon moiety of the formula —$C_nH_{2n+1}$, where n =2–100. A prepolymer unit can also be a large hydrocarbon group (substituted or unsubstituted) of at least 25 carbon atoms, and can contain polymeric or repeating moieties, or both. The prepolymer unit can also be a complex macromolecule of over 200 carbon atoms (e.g., over 400 carbon atoms). For example, a complex prepolymer unit may contain several linking moieties which connect individual hydrocarbon moieties to each other, or to polymeric segments. The linking moieties within the prepolymer unit may be, for example, —O—(C=O)—NH—, —NH—(C=O)—NH— or —NH—(C=O)—O—, or any other moieties which are different from the linking moieties which connect prepolymer units to fullerene cores. The polymeric segments may contain one or more repeating units, and may contain one or more types of monomers. An example of a polymeric segment is a poly(tetramethylene oxide) segment with more than 40 repeating units. As with other embodiments of the invention, the prepolymer units linked to any single fullerene core may be the same or different, and may be linked by the same or different linking moieties. Persons of skill in the art will be able to determine whether a composition of more similar fullerene polymers or a mixture of varied fullerene polymers is more appropriate for a particular application.

In addition to the prepolymer units, the fullerene core may have functionalities such as hydroxyl or amino, or substitutions such as alkoxy or alkyl, which are not linked to a prepolymer unit, e.g., $C_{60}$(—OH)$_{6-8}$[—O—(C=O)—NH—(n-dodecyl)]$_6$, and the polymer (3) prepared in Example 3 below. Methods of preparing polyfunctionalized fullerenes, e.g., polyhydroxylated, polyaminohydroxylated, and polyaminated fullerenes, are described, for example, in U.S. Pat. No. 5,177,248 (hydroxy), and U.S. Pat. No. 5,294,732 (amino, hydroxy, and aminohydroxy). Additional methods can be found in L. Y. Chiang, et al., *J. Chem. Soc., Chem. Comm.* (1992) 1791; L. Y. Chiang, et al., *J. Am. Chem. Soc.*, 115 (1993) 5453; L. Y. Chiang, et al., *J. Am. Chem. Soc.*, 114 (1992) 10154; and L. Y. Chiang, et al., *J. Org. Chem.*, 59 (1994) 3960. Methods of preparing substituted fullerene cores are described, for example, in European Application No. 0 546 718 and in U.S. Pat. No. 5,177,248.

The present invention also includes a polymer made of linked fullerene cores. For example, a fullerene core has a plurality of prepolymer units which are each (i) linked at one end to that core and (ii) linked at the other end to "end-capping" fullerene cores. In this example, both linkages are via one or more of the above-described linking moieties. In a somewhat different embodiment, one or more of the prepolymer units are not end-capped by fullerene cores. The end-capping fullerene cores may have additional functional groups, substitutions, or even additional prepolymer units, attached to them.

The present invention also includes two fullerene cores connected by more than one prepolymer unit. In one example, two fullerene cores may be connected to each other by more than one prepolymer unit, with the distance between the two fullerene cores being no more than approximately one prepolymer unit. In another example, two fullerene cores can be connected by a linear (end-to-end) or branched formation of two or more prepolymer units, with the distance between two fullerene cores being approximately 1.5 or 2 (or more) prepolymer units. The intervening linking moieties between such linear or branched prepolymer units may be any moiety. As noted above, the prepolymer units may be the same or different.

The present invention also includes a fullerene core which is crosslinked to more than one other fullerene core. For example, each fullerene core might be bonded to an average of 4–8 other fullerene cores to form an extended, continuous polymer network. A second fullerene core may be selected, independently from the first fullerene core, from $C_{60}$, $C_{70}$, $C_{76}$, $C_{80}$, $C_{84}$, and $C_{120}$. Furthermore, the second fullerene core may be polyfunctionalized or substituted as described above, in addition to being linked to prepolymer units.

The present invention also encompasses processes for the attachment of a plurality of polymeric arms to a fullerene core. This process includes obtaining a polyfunctionalized fullerene having functional groups independently selected from amino and hydroxy, obtaining a polymeric reagent having a functional group selected from isocyanate and thioisocyanate, reacting fullerene with the polymeric reagent, and separating the reaction product from the reaction mixture.

The term "polyfunctionalized fullerene" is meant to include a fullerene having between 2 and 32 functional groups, independently selected from the group consisting of amino and hydroxy. For example, the nitrogen atom of an amino group is bonded to a carbon atom of the fullerene; similarly, the oxygen atom of the hydroxy group is bonded to a carbon atom of the fullerene. Examples of polyfunctionalized fullerenes include $C_{60}(-OH)_{10-12}$, $C_{60}(-OH)_{14-15}$, $C_{60}(-OH)_{18-20}$, $C_{60}(-OH)_{10-12}(NH_2)_{6-8}$, $C_{60}(-NH_2)_{10-12}$ and $C_{70}(-OH)_{24}$.

The term "a functional group selected from" in "a polymeric reagent having a functional group selected from the group consisting of isocyanate and thioisocyanate" is meant to include a reagent having one or more functional groups, e.g., one, two, or three, which are independently selected from the group consisting of isocyanate and thioisocyanate. Examples include alkyl and aryl diisocyanates and dithiocyanates.

In one such process, the mole ratio of the hydroxyl and amino groups on the fullerene to the thioisocyanate and isocyanate groups on the polymeric reagent is between 1:2 and 1:20 (e.g., 1:10). In another such process, the mole ratio of the groups on the fullerene to the groups on the polymeric reagent is between 10:1 and 1:1. In the present invention, mole ratios are understood to encompass measurements or amounts within twenty percent of the designated ratio. In another embodiment, the present invention further includes adding a substituted or unsubstituted alcohol after the reacting step. Examples include (i) an alcohol having between 1 and 20 carbon atoms such as 1-dodecanol or 2,2'-dichloroethanol, and (ii) a polyfunctionalized hydrocarbon such as fullerene which is polyaminated, polyaminohydroxylated, or polyhydroxylated, such as $C_{60}$ (-13 OH)$_{6-8}$. The present invention includes the products produced by processes disclosed herein, and the processes, according to the methods described herein, to make the products disclosed herein. In addition, the present invention includes final products made from products disclosed herein.

Polymeric arms or addends include both a linking moiety and one or more macromolecular substituents or prepolymer units. The polymeric chains or polymeric arms may be radially arranged with respect to the geometric center of the core; they may be spaced evenly across the surface to form a three-dimensional star polymer, or they may be grouped, for example, near opposite poles.

The polymeric reagents of this invention include the reaction products of (a) an alkyl or aryl isocyanate compound, or an alkyl or aryl thioisocyanate compound, such 4,4'-methylene diphenyl diisocyanate or 4,4'-methylene diphenyl dithiocyanate, and (b) a polyalcohol, e.g., a diol, e.g., poly(tetramethylene oxide) glycol, poly(ethylene oxide)glycol, poly(butadiene) diol, poly(isoprene) diol, poly(hydrogenated butadiene) diol, poly(hydrogenated isoprene) diol, polyester diol, polyethylene diol, polycarbonate diol, polyamide diol, polyurethane diol, polyurea diol, polyanhydride diol, polyimide diol, polyacrylate diol, polymethacrylate diol, polysiloxane diol, and mixtures thereof. In one preferred embodiment, the diol is poly(tetramethylene oxide) glycol. The isocyanate compound is 4,4'-methylene diphenyl isocyanate in another preferred embodiment. Note that an excess of the diisocyanate or dithioisocyanate polymeric reagent is preferably used in a mole ratio of (number of hydroxyl and amino groups) to (number of isocyanate and thiocyanate groups) between 1:2 and 1:20 to form non-crosslinked polymers. The polymeric reagents are thiocyanate or isocyanate prepolymers.

A hydrocarbon moiety as in, for example, $R_1$, $R_2$, and X, refers to substituted, e.g., halogenated, or unsubstituted moieties, having between 1 and 20 carbon atoms, saturated or unsaturated, acylic, cyclic, or polycyclic. Nonlimiting examples include n-dodecyl, methylene diphenyl, napthyl, and polyethylene.

One embodiment of the present invention is the final reaction product of (A) an alcohol having between 1 and 20 carbon atoms and (B) the reaction product of (i) a polyfunctionalized fullerene and (ii) the polymeric reagent being the reaction product of (a) 4,4'-methylene diphenyl diisocyanate or 4,4'-methylene diphenyl dithiocyanate and (b) a diol selected from the group consisting of poly(tetramethylene oxide) glycol, poly(ethylene oxide)glycol, poly(butadiene) diol, poly(isoprene) diol, poly(hydrogenated butadiene) diol, poly(hydrogenated isoprene) diol, polyester diol, polyethylene diol, and polycarbonate diol.

A preferred embodiment of this invention is the final reaction product of (a) 1-dodecanol and (b) the reaction product of (i) polyhydroxylated fullerenes and (ii) the polymeric reagent being the reaction product of 4,4'-methylene diphenyl diisocyanate and poly(tetramethylene oxide) glycol, wherein the mole ratio of hydroxy groups on said polyhydroxylated fullerenes to isocyanate groups on said polymeric reagent is between 1:2 and 1:20, e.g., 1:10, to form said reaction product of (i) and (ii).

Another preferred embodiment of this invention is the reaction product of (i) polyhydroxylated fullerenes and (ii) the prepolymer reaction product of 4,4'-methylene diphenyl diisocyanate and poly(tetramethylene oxide)glycol, wherein the mole ratio of hydroxy groups on the polyhydroxylated fullerenes to isocyanate groups on the prepolymer reaction product is between 10:1 and 1:1 to form said polymer.

Without further elaboration, it is believed that one skilled in the art can, based on the description herein, utilize the present invention to its fullest extent. The following specific embodiments are, therefore, to be construed as merely illustrative, and not limitative of the remainder of the disclosure in any way. All references cited herein are hereby incorporated by reference.

EXAMPLE 1

A four-necked reaction vessel (500 mL) equipped with a stainless-steel stirrer was charged with 4,4'-methane diphenyl diisocyanate (MDI, 11.9 g) and poly(tetramethylene oxide) glycol (PTMO, $M_n$=2,000, 47.6 g). The reagent mixture was stirred at 60–60° C. under $N_2$ for a period of 4h. At the end of reaction, the unreacted 4,4'-methane diphenyl diisocyanate was removed from reaction product by washing 5×50 mL with acetonitrile (5 times, 50 mL each time) under $N_2$. Acetonitrile washings were removed by syringe. Drying under vacuum yielded diisocyanate-capped urethane polyether prepolymer (1) (46.3 g).

EXAMPLE 2

Preparation of the diisocyanate prepolymer 2 was carried out by the reaction of poly(tetramethylene oxide) glycol (PTMO) with 4,4'-methane diphenyl diisocyanate (MDI, 2.0 equiv.) in $CDCl_3$ at 60° C. under $N_2$ for 10 hours. The average molecular weight of poly(tetramethylene oxide) glycol was determined by gel permeation chromatography (GPC) calibrated with a PTMO standard to be $M_n$=2,000 and $M_w$=4,500 with a polydispersity of 2.25. The progress of the reaction monitored by the decreasing intensity of the infrared band at 3480 cm$^{-1}$, corresponding to the hydroxyl absorption.

EXAMPLE 3

The condensation reaction between the prepolymer 2 and polyfunctionalized fullerene 1 was performed in a mixture of anhydrous THF and DMF (3:1) at 60° C. under $N_2$ for 16 h. To completely eliminate the cross-linking reaction, an excess of diisocyanated urethane polyether prepolymers 2 (10 equiv. of isocyanate for each hydroxy on fullerenol) was used.

After 16 hours, the mixture was allowed to react further with 1-dodecanol. Bis(1-dodecanoxy) poly(urethane ether) 4, (the byproduct resulting from the reaction of 1-dodecanol with the unreacted prepolymer 2, was removed by repeated precipitation of the final product from the THF solution into methanol, followed by washing with a mixture of THF and methanol. The corresponding $C_{60}$ urethane polyether star-polymer 3 was isolated as soluble, highly viscous brownish-red semi-solids in high yield (more than 15 times the weight of the starting fullerenol was obtained).

As anticipated, the infrared spectrum of the star-polymer product 3 closely resembled that of bis(1-dodecanoxy) poly (urethane ether) prepolymer 4, showing the disappearance of a band at 2272 $cm^{-1}$ corresponding to the isocyanate absorption, as well as the disappearance of a baud at 3550 $cm^{-1}$ hydroxyl absorptions. The conversion of isocyanate functional groups into urethanes moieties was evident through an observation of a band at 3300 $cm^{-1}$ and a strong band at 1733 $cm^{-1}$ corresponding to the urethanic —NH— and carbonyl absorptions, respectively.

EXAMPLE 4

The molecular weight of star-polymer 3 was determined mainly by its GPC spectrum (using toluene as eluent) and confirmed by the light scattering measurements. In the GPC study, the spectrum was calibrated by the polystyrene standards. To ensure and examine the suitability and accuracy of calibration by the linear styrene oligomers, two star model compounds were synthesized. Compound 5 contained three urethane polyether arms and compound 6 contained four urethane polyether arms. These model compounds were obtained by the reaction of the diisocyanated urethane polyether prepolymer 2 with triethanolamine or pentaerythritol, respectively, following by quenching with 1-dodecanol.

The GPC spectra of oligomers 5 and 6 indicated an average molecular weight of $M_n$ 9,260 ($M_w$ 15,200 with a polydispersity of 1.64) and $M_n$ 12,600 ($M_w$ 20,300 with a polydispersity of 1.61), respectively. These data are consistent with a material having roughly three and four times, respectively, the molecular weight of bis(1-dodecanoxy) poly(urethane ether) 4 ($M_n$ 2,600 and $M_w$ with a polydispersity of 2.11). Thus, the average molecular weight of 3 was determined to be $M_n$ 18,000 and $M_w$ 26,100, which corresponds to a fullerenol-based star polymer with an average of six urethane polyether arms.

Most significantly, the polydispersity (1.45) of 3 is notably narrower than that of the single polymer chain 4 (2.11). The only way to increase the number of polymer arms randomly bonded to a star polymer without increasing the polydispersity is to restrict the number of polymer arms to a fairly narrow, uniform distribution. The phenomena occurs in both the model polymer 5 (polydispersity equals 1.64) and 6 (polydispersity equals 1.61), both with a structure containing a fixed number of polymer arms. The GPC data also demonstrated that the polydispersity value of the star polymers having a fixed number of polymer arms tends to be lower than that of the parent polymer arm alone.

EXAMPLE 5

The average number of repeating tetramethylene PTMO units in structures 3, 4, 5, and 6 was also determined by $^1H$ NMR spectroscopic study. The chemical shift of two types of aromatic protons in the MDI-derived urethane moieties can be readily identified at $\gamma$ 7.08 (d, J=10 Hz) and 7.28 (d, J=10 Hz). The intensity of each group of peaks corresponds to 8 protons in one polymer arm as shown in Scheme I. Therefore, the value of integration ratio between these aromatic protons and the oxygenated methylene protons (at $\gamma$3.40) or the non-oxygenated methylene protons (at $\gamma$ 1.62) in the PTMO moieties allows an accurate estimation of the average molecular weight of PTMO. As a result, each PTMO segment was found to contain 42 tetramethylene repeating units. This indicates an average molecular weight in poly(urethane ether) 4 for each polymer arm as 3,920 or 3,790 Daltons, respectively, which is between $M_n$ (2,600) and $M_w$ (5,450) of 4. Furthermore, this analysis results in the determination of the average molecular weight of 3 as $2.4 \times 10^4$ Dalton.

EXAMPLE 6

One unexpected physical property of star polymer 3 is its unusual thermal behavior at low temperatures. Although the molecular weight of 3 is 6 times that of the linear poly (urethane ether) 4, the glass transition temperature ($T_g$) of 3 was found to be $-67°$ C., only slightly higher than that of 4 ($-71°$ C.), 5 ($-70°$ C.), and 6 ($-69°$ C.) calculated from the DSC (differential scanning calorimetry) profiles. There was a systematic, gradual increase in the glass transition temperature from the linear structure of 4 to 5 (three-armed star) and 6 (four-armed star) and then to the six-armed star polymer 3.

EXAMPLE 7

With respect to the PTMO chain softening temperature, all four polymers were found to turn into a paste-like material upon heating in a similar temperature range at 21° C. (34.3 J/g), 22° C. (45.3 J/g), 23° C. (43.5 J/g), and 23° C. (42.7 J/g) for 3, 4, 5, and 6, respectively. All four polymers also showed similar thermal properties in the recrystallization of oligomeric PTMO chains after heating. While the linear polymer 4 had a more intense recrystallization transition at $-25°$ C. (45.0 J/g), the other star polymers 3, 5, and 6 exhibited only a moderate to weak transition at $-31°$ C., $-29°$ C., and $-31°$ C., respectively. These profiles indicate that each polymer arm on the $C_{60}$ molecule reacts independently to temperature fluctuations in a manner similar to the parent linear polymer 4. Due to the star shape of 3, 5, and 6, the ability of polymer arms to recrystallize decreases significantly.

EXAMPLE 8

A four-necked reaction vessel (500 mL) equipped with a stainless-steel stirrer was charged with 4,4'-methane diphenyl diisocyanate (MDI, 11.9 g) and poly(tetramethylene oxide) glycol (PTMO, $M_n$=2,000, 47.6 g). The reagent mixture was stirred at 60°–60° C. under $N_2$ for a period of 4h. At the end of reaction, the unreacted 4,4'-methane diphenyl diisocyanate was removed from reaction product by washing 5×50 mL with acetonitrile (5 times, 50 mL each time) under $N_2$. Acetonitrile washings were removed by syringe. Drying under vacuum yielded diisocyanate-capped urethane polyether prepolymer (46.3 g).

A reaction flask A (250 mL) connected with a condenser and an inert gas bubbler was charged with diisocyanate-capped urethane polyether prepolymer (25 g), anhydrous tetrahydrofuran (90 mL, distilled over sodium), and dimethylformamide (10 mL, dried over molecular sieves). The mixture was stirred at ambient temperature until complete resolution of isocyanate-capped urethan polyether prepolymer. In a separate reaction flask B (50 mL), polyhydroxylated fullerene derivatives (fullerenols, 1.5g) was dissolved in dimethylformamide (25 mL) and the solution was dried over 4Å molecular sieves for 2 days. The fullerenol solution in flask B was then added into the reaction flask A. The resulting mixture was stirred at 60°–65° C. for 16h under $N_2$. The solution became a gel within 5 hours of reaction. The solvent was allowed to evaporate slowly under $N_2$ to afford a rubbery film. The film was suspended in methanol and treated briefly in a ultrasonic bath at ambient temperature for 30 minutes. Removal of methanol and drying under vacuum at 60° C. yielded the product fullerenol-crosslinked polyurethane networks (23 g).

EXAMPLE 9

The preparation of polymer-networks was carried out by the treatment of fullerenol 1, $C_{60}(OH)_{10-12}$, with diisocyanated urethane polyether prepolymer 2 (1.0 equiv. of isocyanate to each hydroxy on fullerenol) in a mixture of anhydrous THF and DMF (3:1) at 60° C. under $N_2$ for 16 hours. Diisocyanated prepolymer 2 was prepared by the reaction of poly(tetramethylene oxide) glycol (PTMO) with 4,4'-methane diphenyl disocyanate (MDI, 2.0 equiv.) in $CDCl_3$ at 60° C. under $N_2$. The average molecular weight of poly(tetramethylene oxide) glycol used was determined to be $M_n$ 2,000 and $M_w$ 4,500 with a polydispersity of 2.25. Prior to the isocyanate-hydroxyl condensation reaction, the fullerenol was predried under vacuum at 60° C. for 24h. Water was removed from the reaction medium by drying the DMF-THF solution over molecular sieves (4Å) for 2 days. Progress of the reaction was monitored by the decreasing intensity of the hydroxyl absorption band at 3480 $cm^{-1}$. Gradual gel formation was observed during the first few hours of reaction. At the end of the reaction, the residual isocyanate functionalities were quenched with methanol under ultrasonic treatment. After the solvent evaporation and the subsequent drying in vacuum, the corresponding [$C_{60}$] fullerenol cross-linked polyurethane 7 was isolated as a thick, free-standing film.

The infrared spectrum of the cross-linked fullerenol polyurethane product 7 showed the disappearance of a band around 2272 $cm^{-1}$ corresponding to the isocyanate absorption and the sharp decrease of hydroxyl absorptions centered at 3550 $cm^{-1}$. The conversion of isocyanate functions into urethanes was evident through an observation of a band at 3300 $cm^{-1}$. The conversion of isocyanate functions into urethanes was evident through an observation of a band at 3300 $cm^{-1}$ and strong band at 1733 $cm^{-1}$ corresponding to the urethanic —NH— and carbonyl absorptions, respectively.

EXAMPLE 10

The thermal behavior of highly cross-linked polyurethane 7 at low temperatures is remarkable. To facilitate the correlation of physical properties of 7 to its linear polymer version, bis(1-dodecanoxy) poly(urethane ether) 4 was synthesized from the reaction of 1-dodecanol (2.0 equiv.) with the diisocyanate prepolymer 2 at 60° C.

Interestingly, the glass transition temperature of 7 was found to be −70° C., very similar to that of 4 (−71° C.), as shown in the DSC profiles. Thermal properties of both the PTMO chain softening behavior and recrystallization of 7 upon heating at 7° C. and −32° C., respectively, were detected at temperatures much lower than those of 4 at 22° C. and −25° C. respectively. These observations suggest that each polyurethane chain chemically attached on $C_{60}$ molecules in polymer network 7 behaves independently under temperature fluctuation.

EXAMPLE 11

The thermal mechanical properties of 7 were studied using a flat-point probe. An enlargement of the polymer's dimension was observed at an onset temperature of −70° C. which is consistent with its glass transition temperature. This thermogram contained by a region with nearly constant polymer dimensions at temperatures between −33° C. and −20° C., where the recrystallization transition of 7 occurs. The PTMO chain softening transition at roughly 5° C. induced a sharp increase in polymer dimension before the linear thermal expansion at higher temperatures. Furthermore, the thermal penetration of polymer film by probe under a constant force of was not appeared until temperature reaching about 191° C.

EXAMPLE 12

A reaction flask A (250 mL) equipped with a condenser and an inert gas bubbler was charged with diisocyanate-capped urethane polyether prepolymer (25 g, excess) or monoisocyanate-capped urethane polyether prepolymer 25g, anhydrous tetrahydrofuran (90 mL, distilled over sodium), and dimethylformamide (10 mL, dried over 4Å molecular sieves for 2 days. The fullerenol solution in flask B was then added to the reaction flask A at ambient temperature. The resulting mixture was stirred at 60°–65° C. for 16h under $N_2$. At the end of reaction, 1-dodecanol (4.0 g) was added to form the urethan functionalities at each isocyanate-capped prepolymer chain-end while temperature was maintained at 60° C. After 1h, the reaction products were washed repeatedly with a mixture of methanol and tetrahydrofuran (3:1) and dried under vacuum at 60° C. Fullerene-based star-shaped poly(urethane-ether) was obtained as a dark-brown semi-solid (2.3 g).

Other Embodiments

From the above description, one skilled in the art can easily ascertain the essential characteristics of the present invention, and without departing form the spirit and scope thereof, can make various changes and modifications of the invention to adapt it to various usages and conditions. Thus, other embodiments are also within the claims.

What is claimed is:

1. A polymer comprising a fullerene core; and a plurality of prepolymer units;

wherein each of said prepolymer units is linked to a carbon atom of said core by a moiety $M^1$ in the sequence of F—$M^1$—P, wherein F represents said fullerene core, P represents one of said prepolymer units, and $M^1$ is independently selected from the group consisting of —O—(C=O)—NH—, —NH—(C=O)—NH—, —O—(C=S)—NH—, and —NH—(C=S)—NH—; a carbon atom of said core being bonded to the left-terminal oxygen or nitrogen atom of $M^1$ and the right-terminal nitrogen atom of $M^1$ being bonded to a carbon atom of each of said prepolymer units.

2. The polymer of claim 1, wherein each of said prepolymer units comprise the formula:

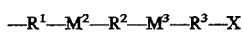

wherein $R^1$ is a hydrocarbon moiety of 1 to 20 carbon atoms, $R^1$ being bonded to said right-terminal nitrogen atom of $M^{1;}$ $M^2$ is selected from the group consisting of —NH—(C=O)—O—, —NH—(C=O)—NH—, —NH—(C=S)—O—, and —NH—(C=S)—NH—;

R² is a polymeric moiety selected from the group consisting of poly(tetramethylene oxide), poly(ethylene oxide), poly(butadiene), poly(isoprene), poly(hydrogenated butadiene), poly(hydrogenated isoprene), polyester, polyethylene, polycarbonate, polyamido, polyurethane, polyurea, polyanhydride, polyimide, polyacrylate, polymethacrylate, and polysiloxane;

M³ is a moiety selected from the group consisting of —O—(C=O)—NH—, —NH—(C=O)—NH—, —O—(C=S)—NH—, and —NH—(C=S)—NH—;

R³ is a hydrocarbon moiety of 1 to 20 carbon atoms;

X is a moiety selected from the group consisting of —NH—(C=O)—O—, —NH—(C=O)—NH—, —NH—(C=S)—O—, —NH—(C=S)—NH—, —N=C=O, and —N=C=S; or x is a moiety selected from the group consisting of —NH—(C=O)—O—Y, —NH—(C=O)—NH—Y, —NH—(C=S)—O—Y, and —NH—(C=S)—NH—Y, wherein Y is hydrogen or a hydrocarbon moiety of 1 to 20 carbon atoms bonded to the right-terminal nitrogen or oxygen atom of one of said moieties.

3. The polymer of claim 2, wherein said fullerene core is selected from the group consisting of $C_{60}$, $C_{70}$, $C_{78}$, and $C_{84}$.

4. The polymer of claim 3, wherein said fullerene core is $C_{60}$.

5. The polymer of claim 2, wherein M¹ and M³ are both —O—(C=O)—NH— and M² is —NH—(C=O)—O—, and X is —NH—(C=O)—O— or —NH—(C=O)—O—Y.

6. The polymer of claim 5, wherein said fullerene core is $C_{60}$.

7. The polymer of claim 5, wherein R¹ is 4,4'-methylene diphenyl, R² is a polymeric moiety of poly(tetramethylene oxide), R³ is 4,4'methylene diphenyl, and Y is hydrogen or a hydrocarbon moiety of 1 to 20 carbon atoms.

8. The polymer of claim 5, wherein said polymer is the final reaction product of (a) 1-dodecanol and (b) the reaction product of (i) polyhydroxylated fullerenes and (ii) the polymeric reagent being the reaction product of 4,4'-methylene diphenyl diisocyanate and poly(tetramethylene oxide) glycol, wherein the mole ratio of hydroxy groups on said polyhydroxylated fullerenes to isocyanate groups on said polymeric reagent is between 1:2 and 1:20, to form said reaction product of (i) and (ii).

9. The polymer of claim 8, wherein said mole ratio is 1:10.

10. The polymer of claim 5, wherein said polymer is the reaction product of (i) polyhydroxylated fullerenes and (ii) the prepolymer reaction product of 4,4'-methylene diphenyl diisocyanate and poly(tetramethylene oxide)glycol, wherein the mole ratio of hydroxy groups on said polyhydroxylated fullerenes to isocyanate groups on said prepolymer reaction product is between 10:1 and 1:1, to form said polymer.

11. The polymer of claim 10, wherein said mole ratio is 1:1.

12. The polymer of claim 2, wherein M¹ and M³ are both —O—(C=S)—NH— and M² is —NH—(C=S)—O—, and X is —NH—(C=S)—O— or —NH—(C=S)—O—Y.

13. The polymer of claim 12, wherein said fullerene core is $C_{60}$.

14. The polymer of claim 2, wherein R¹ and R³ are each 4,4'-methylene diphenyl.

15. The polymer of claim 2, wherein X is —N=C=O or —N=C=S.

16. The polymer of claim 2, further comprising a second fullerene moiety, wherein the right-terminal oxygen or nitrogen atom of moiety X is bonded to a carbon atom of said second fullerene moiety, X being —NH—(C=O)—O—, —NH—(C=O)—NH—, —NH—(C=S)—O—, or —NH—(C=S)—NH—.

17. The polymer of claim 1, wherein said polymer is the final reaction product of (A) an alcohol having between 1 and 20 carbon atoms and (B) the reaction product of (i) a polyfunctionalized fullerene and (ii) a polymeric reagent being the reaction product of (a) 4,4'-methylene diphenyl diisocyanate or 4,4'-methylene diphenyl dithiocyanate and (b) a diol selected from the group consisting of poly(tetramethylene oxide) glycol, poly(ethylene oxide) glycol, poly(butadiene) diol, poly(isoprene) diol, poly(hydrogenated butadiene) diol, poly(hydrogenated isoprene) diol, polyester diol, polyethylene diol, polycarbonate diol, polyamide diol, polyurethane diol, polyurea diol, polyanhydride diol, polyimide diol, polyacrylate diol, polymethacrylate diol, and polysiloxane diol.

18. The polymer of claim 17, wherein said fullerene core is selected from the group consisting of $C_{60}$, $C_{70}$, $C_{78}$, and $C_{84}$.

19. The polymer of claim 18, wherein said fullerene core is $C_{60}$.

* * * * *